United States Patent [19]
MacKay et al.

[11] Patent Number: 5,503,948
[45] Date of Patent: Apr. 2, 1996

[54] THIN CELL ELECTROCHEMICAL BATTERY SYSTEM; AND METHOD OF INTERCONNECTING MULTIPLE THIN CELLS

[75] Inventors: Colin A. MacKay, Bournemouth, England; Michael A. Olla, Austin, Tex.

[73] Assignee: Microelectronics and Computer Technology Corporation, Austin, Tex.

[21] Appl. No.: 285,055

[22] Filed: Aug. 2, 1994

[51] Int. Cl.⁶ .................................................. H01M 10/04
[52] U.S. Cl. .......................... 429/152; 429/160; 429/161; 29/623.1
[58] Field of Search ...................................... 429/149, 152, 429/158, 160, 161, 163, 185, 211; 29/623.1, 623.2

[56] References Cited

U.S. PATENT DOCUMENTS

| | | |
|---|---|---|
| 3,599,181 | 8/1971 | Dearasky . |
| 3,725,298 | 4/1973 | Woodhead et al. . |
| 4,009,052 | 2/1977 | Whittingham . |
| 4,252,876 | 2/1981 | Koch . |
| 4,303,748 | 12/1981 | Armand et al. . |
| 4,471,037 | 9/1984 | Bannister . |
| 4,547,440 | 10/1985 | Hooper et al. . |
| 4,556,615 | 12/1985 | Bannister . |
| 4,589,197 | 5/1986 | North . |
| 4,631,810 | 12/1986 | Hooper et al. . |
| 4,638,407 | 1/1987 | Lundsgaard . |
| 4,748,093 | 5/1988 | Turner . |
| 4,748,542 | 5/1988 | Lundsgaard . |
| 4,845,335 | 7/1989 | Andrews et al. . |
| 4,851,308 | 7/1989 | Akhtar . |
| 4,886,716 | 12/1989 | Roggero et al. . |
| 4,911,966 | 3/1990 | Murayama et al. . |
| 4,925,751 | 5/1990 | Shackle et al. . |
| 4,935,317 | 6/1990 | Fauteux et al. . |
| 4,968,319 | 11/1990 | Muller et al. . |
| 5,008,512 | 4/1991 | Spletter et al. . |
| 5,049,718 | 9/1991 | Spletter et al. . |
| 5,053,195 | 10/1991 | MacKay . |
| 5,083,007 | 1/1992 | Spletter et al. . |
| 5,225,157 | 7/1993 | McKay . |
| 5,272,309 | 12/1993 | Goruganthu et al. . |

FOREIGN PATENT DOCUMENTS

84/2987  4/1984  South Africa .

*Primary Examiner*—Anthony Skapars
*Attorney, Agent, or Firm*—Conley, Rose & Tayon

[57] ABSTRACT

Multicell system and method for making a multicell system. Systems include relatively thin (less than about 50 mil) electrochemical cells layered upon one another to minimize volume and weight. Cells systems are formed with cells that are layered such that first charge sides of each cell are coupled to first charge sides of other cells, and such that second charge sides of each cell are coupled to second charge sides of other cells. Cells and/or cell systems is connected to other cells and/or cell systems to form battery systems by layering cells such that a first charge side of a cell are coupled to second charge side of another cell. In this manner the number of electrically insulating separators is reduced, thereby also reducing weight and volume of resulting systems.

69 Claims, 8 Drawing Sheets

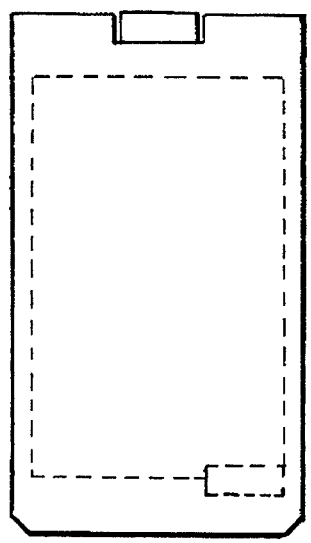
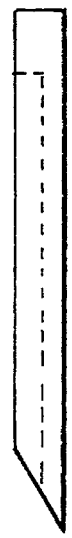
FIG. 1A  FIG. 1B
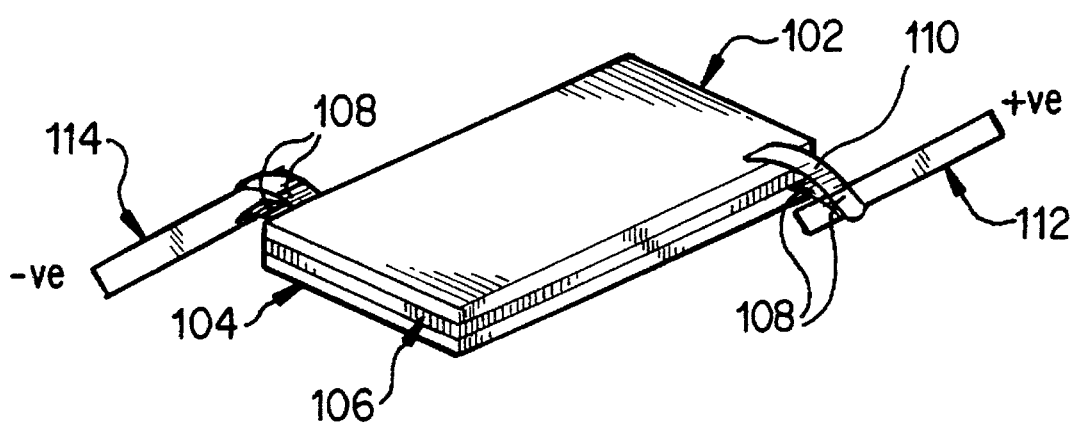
FIG. 2

THIN CELL ELECTROCHEMICAL BATTERY SYSTEM; AND METHOD OF INTERCONNECTING MULTIPLE THIN CELLS

BACKGROUND OF THE INVENTION

1. Field of the Invention

This invention relates a system of electrochemical cells, and a method of interconnecting these cells. In particular, this invention may be used with separate laminar film lithium polymer cells to make lightweight rechargeable batteries.

2. Brief Description of the Related Art

Relatively thin film lithium polymer electrolyte battery systems have relatively high theoretical energy densities, which indicate that these systems may be particularly useful for lightweight battery systems. Such systems may be used for portable computers, phones, automobiles, and the like. These systems, however, have not been as widely commercialized as might be possible, due in part to engineering problems associated with designing and handling the soft, thin film materials of these systems.

U.S. Pat. No. 5,053,195 relates to an amalgam and a method of preparing an amalgam for bonding two particles together.

U.S. Pat. No. 5,049,718 relates to a method of laser bonding for gold, goal coated and gold alloy coated electrical members.

U.S. Pat. No. 5,008,512 relates to a method of laser bonding electrical members.

U.S. Pat. No. 4,845,335 relates to a laser bonding apparatus and method.

U.S. Pat. No. 5,083,007 relates to bonding metal electrical members with a frequency doubled pulsed laser beam.

U.S. Pat. No. 5,225,157 relates to an amalgam composition and room temperature bonding.

U.S. Pat. No. 5,272,309 relates to bonding metal members with multiple laser beams (Ser. No. 07/822,273 filed Jan. 22, 1992).

U.S. Pat. No. 4,851,308 relates to solid-state energy cells wherein the electrolyte comprises an organic support and an inorganic salt.

U.S. Pat. No. 4,303,748 relates to electrochemical generators for producing current and new materials for their manufacture.

U.S. Pat. No. 4,935,317 relates to a method for producing solid state electrochemical laminar cells utilizing a cathode rolling process.

U.S. Pat. No. 4,911,966 relates to an electrochemical cell.

U.S. Pat. No. 4,252,876 relates to a lithium battery.

U.S. Pat. Nos. 4,638,407 and 4,748,542 relate to a solid state electrochemical devices.

U.S. Pat. No. 4,968,319 relates to a process for production of an electrochemical sub-assembly comprising an electrode and an electrolyte, and the sub-assembly obtained in this way.

U.S. Pat. No. 4,886,716 relates to solid polymeric electrolyte and electrochemical generators containing it.

U.S. Pat. No. 4,925,751 relates to high power solid state electrochemical laminar cell.

U.S. Pat. No. 4,009,052 relates to a chalcogenide battery.

All of the above-referenced patents are hereby incorporated by reference.

SUMMARY OF THE INVENTION

This invention relates to a system and method involving electrically interconnecting a plurality of relatively thin separate electrochemical cells including:

layering a first cell and a second cell wherein both the first and second cells are each less than about 50 mils thick and comprise an electrolyte, a positive charge side, and a negative charge side located opposite the positive charge side, the layering being such that the positive charge side of the first cell is coupled to the positive charge side of the second cell to form a first positive zone;

layering a third cell that is less than about 50 mils thick and comprises an electrolyte, a positive charge side, and a negative charge side located opposite the positive charge side, the layering being such that the negative charge side of the third cell is coupled to the negative charge side of the second cell to form a first negative zone;

electrically interconnecting the negative charge side of the first cell to the first negative zone;

electrically interconnecting the first positive zone to the positive charge side of the third cell.

It is to be understood that in all embodiments of the method or system of the invention the positive and negative charge sides may be reversed from those explicitly mentioned herein. For instance, the above-mentioned embodiment could be written to describe "first and second" charge sides whereby the first charge side would be positive or negative, and the second charge side would have an opposite charge from the first charge side.

Preferably the cells are substantially planer and are layered without substantial bending or folding of the cells. Significantly, the cells are discrete separate cells coupled together, instead of a single cell that is bent or folded. Moreover, the cells are all less than about 50 mils thick and preferably include lithium polymer materials.

In a preferred embodiment at least two cells that are interconnected make up a set of cells. This embodiment may further include electrically interconnecting a first set of cells to a second set of cells. The first set of cells may be interconnected to the second set of cells by layering a charged side of a cell in the first set on an oppositely charged side of a cell in the second set. Alternately, the method or system may involve interconnecting a third set of cells to the first or second set of cells by layering a cell from the third set of cells on the first or second sets, the layering being such that a charged side of a cell in the first or second sets is placed against a first side of an electrically insulating separator, and a second side of the electrically insulating separator is placed against a like-charged side of a cell in the third set, and wherein a charged side of a cell in the first or second sets is interconnected to an oppositely charged side of a cell in the third set.

The method may include interconnecting by (i) layering a charged side of a cell in one set to an oppositely charged side of a cell in another set, (ii) placing an electrically insulating separator between a charged side of a cell in one set and a like-charged side of a cell in another set, and (iii) interconnecting a charged side of a cell in one set to an oppositely charged side of a cell in another set, the interconnecting being such that a minimum number of separators are used.

The method may include layering a fourth cell such that a positive charge side of the fourth cell is coupled to the positive charge side of the third cell to form a second positive charge zone, and further interconnecting the positive charge side of the first cell to the second positive charge zone. The first negative zone may be interconnected to the negative charge side of the fourth cell.

In another embodiment a plurality of cells may include an electrically conducting lobe extending laterally from an edge of each cell and connected to positive or negative charge sides of the cells. The interconnecting may be performed by electrically connecting lobes together. The lobes connected to positive charge sides may extend from a first edge of each cell such that these positive lobes are substantially vertically aligned with one another, and the lobes connected to negative charge sides may extend from a second edge of each cell such that these negative lobes are substantially vertically aligned with one another. The first and second edges of the cells may be opposite or traverse to each other. This method may include placing an electrically insulating separator between a portion of at least one lobe and the cell to which it is connected, the separator being placed such that the lobe is electrically connected to a positive or negative charge of the cell but is otherwise electrically insulated from the cell.

In another embodiment, layering and interconnecting may be performed by:

aligning the cells side by side such that the positive and negative charge sides of the cells are each facing the same direction;

connecting a first foldable electrically interconnecting material to sides of the cells, the connecting being such that the negative charge side of the first cell is electrically interconnected by the material to the negative charge side of the second cell;

connecting a second foldable electrically interconnecting material to sides of the cells, the connecting being such that the positive charge side of the second cell is electrically interconnected by the material to the positive charge side of the third cell; and layering the cells such that the first and second foldable material is folded to form a connecting hinge between cells, the layering being such that the positive charge side of the first cell is coupled to the positive charge side of the second cell to form the first positive charge zone, and the negative charge side of the third cell is coupled to the negative charge side of the second cell to form the first negative charge zone.

The method may involve placing an electrically insulating separator between a portion of the foldable material and the cell to which it is connected, the separator being placed such that the foldable material is electrically connected to a positive or negative charge side of the cell but is otherwise electrically insulated from the cell. The system may include cells layered such that the foldable material is folded to form a connecting hinge between cells, the layering being such that the positive charge side of the first cell is coupled to the positive charge side of the second cell to form the first positive charge zone, and the negative charge side of the third cell is coupled to the negative side of the second cell to form the first negative charge zone.

In all embodiments interconnecting may be performed using conductive adhesive bonding, compressive cold welding, laser bonding, soldering or welding.

Interconnecting may also be performed using interconnecting pieces (e.g., strips of material such as tape, metal, rubber, polymers, or fiberglass) that include a first adhesive side, the interconnecting pieces being coupled to the electrochemical cells. These pieces may include metal foil with electrically conducting adhesive applied to one side of the foil to form an adhesive side. They may also include a second substantially nonadhesive side. The method may further include applying conductive adhesive to the second substantially nonadhesive side of the interconnecting pieces. Interconnecting pieces are preferably coupled to cells prior to the cells being layered.

Each cell has edges, and the method may further include applying an insulator to an edge of each cell (see FIG. 7, assembly stage one). The interconnecting pieces may be coupled to the electrochemical cells such that the interconnecting pieces are coupled to a positive or negative charge side of the cells, the pieces extending across the insulator applied to the edges of each cell. The insulator may be insulating tape.

The interconnecting pieces may include ends that are coupled to the positive or negative charge sides of the cells, and wherein the interconnecting pieces are electrically insulated except at the ends. For instance, these interconnecting pieces may be made of insulated wire or tape.

Liquid conductive adhesive bonding material (e.g., glue) may be applied to the sides of the cells prior to layering.

The cells used for the method and system of the invention are preferably lithium polymer cells. The cathode preferably includes vanadium oxide compounds and/or any other interconnecting compounds such as $TiS_2$.

As shown in FIG. 8, a cell preferably includes a substantially planer electrolyte 301 with a first side coupled to a first side of a substantially planer anode 302, and a second side coupled to a first side of a substantially planer cathode 303, the anode 302 and cathode 303 both having second sides that are opposite the first sides, these second sides being coupled to current collectors 304. As shown in FIG. 9, in an alternate embodiment a cell preferably includes a substantially planer anode 302 with a first side opposite a second side, both sides of the anode being coupled to first sides of substantially planer electrolytes 301, the electrolytes 301 both having second sides which are coupled to substantially planer cathodes 303, the cathodes 303 both having second sides that are coupled to current collectors 304.

Preferably the method includes recharging the cells, the cells being rechargeable.

In some embodiments, the method may include further bending of the cells, especially after the cells are interconnected. In this manner cell systems or batteries may be formed by folded or bent to conform to a wide variety of desired shapes (e.g., a fireman's hat, a portable telephone, a radio, a T.V., or a laptop computer panel).

The method preferably includes hermetically sealing the cells, thereby inhibiting cell degradation due to oxidation or vaporization of cell components.

The invention is also directed to a system of relatively thin separate electrochemical cells including:

a first cell layered on a second cell, the first and second cells each being less than about 50 mils thick and each comprising an electrolyte, a positive charge side, and a negative charge side located opposite the positive charge side, the layering being such that the positive charge side of the first cell is coupled to the positive charge side of the second cell to form a first positive charge zone;

a third cell layered on the first and second cells, the third cell being less than about 50 mils thick and comprising an electrolyte, a positive charge side, and a negative charge side located opposite the positive charge side, the layering being such that the negative charge side of the third cell is coupled to the negative charge side of the second cell to form a first negative charge zone;

an electrical interconnection interconnecting the negative charge side of the first cell to the first negative charge zone;

an electrical interconnection interconnecting the first positive charge zone to the positive charge side of the third cell.

The cells are preferably substantially planer and are not substantially bent or folded. At least two cells which are electrically interconnected may make up a set. The system may include a first set of cells electrically interconnected to a second set of cells. Preferably the first set of cells is interconnected to the second set of cells such that a charged side of a cell in the first set is coupled to an oppositely charged side of a cell in the second set. Preferably a third set of cells is interconnected to the first and second sets. An electrically insulating separator is preferably between a charged side of a cell in the first or second sets and a like-charged side of a cell in the third set.

In preferred embodiments the interconnections are such that the system comprises a minimum number of separators. In this manner weight and volume for the resulting battery systems is reduced.

BRIEF DESCRIPTION OF THE DRAWINGS

FIGS. 1A and 1B depict a drawing of a Motorola battery cavity.

FIG. 2 depicts a cell system made using a "bunny ear" interconnect system.

DETAILED DESCRIPTION OF THE PREFERRED EMBODIMENTS

Figure 3A:
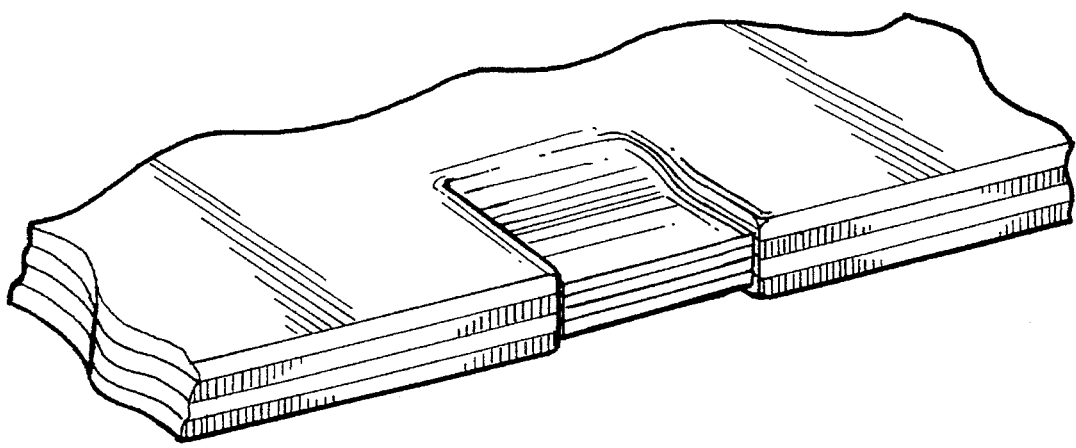
FIGS. 3A and 3B depict a cell system made using a "cold welding" interconnect system.

Single films or sheets of polymeric electrochemical materials may be used to make battery and/or multiple electrochemical cell systems. The electrical capacity of a cell made of polymeric electrochemical material depends upon the total area of each cell. As such, it is possible to build a complete compact electrical battery as a single cell by folding a large cell onto itself much like a hand-held fan. Each film or sheet of polymeric electrochemical material typically includes a positive charge side (i.e., electrode) and a negative charge side (i.e., electrode), and is an electrochemical solid state polymer electrolyte cell.

Folded sheets of electrochemical material tend to have a disadvantage in that defects can arise in the electrochemical materials at the bends or folds. These bends or folds tend to unduly stress the electrochemical material, thereby causing electrochemical degradation, especially when the bends or folds are sharp. As a result, battery systems including such bends or folds in their construction tend to exhibit reduced performance after only as few as 100 charge/recharge cycles, which is much less than a desired performance of at least about 1000 charge/recharge cycles before significant degradation. One way to approach the desired performance of 1000 charge/recharge cycles is to overcome the disadvantages caused by bends or folds. This may be achieved by building battery systems made of multiple separate and planar cells bonded together in multilayer stacks without substantial bends or folds.

Many relatively thin polymeric film, sheet, or layer battery systems are believed to be particularly susceptible to degradation when bends and folds in the film, sheet, or layer are present because of the particular makeup of these systems. For instance, many of these systems typically include chalcogen particles such as $TiS_2$, $V_2O_5$, and $V_6O_{13}$ as their cathode materials. These chalcogens may be bonded with polymers (e.g., polyethylene oxide, polypropylene oxide, and other polymers that may, for example, be of the general group having 2 to 18 carbon atoms to each heteroatom), together with graphite material. Ions such as lithium, sodium (or other cation derivatives of alkali metals) are interstitially trapped in the chalcogens during discharge. These ions move back and forth through the electrolyte during charge/recharge cycles.

When relatively thin film materials are bent or folded, the outside radius tends to stretch while the inside radius tends to compress. As a result of this stretching and compressing, it is believed that potential exists for shearing the adhesion between chalcogen particles and the polymer. While the shearing may only be incremental, as the number of discharge cycles increases, any gaps between polymer and chalcogen particles may enlarge, causing increases in internal resistance. During recharge, when conditions are relatively highly oxidative, these increases in internal resistance can initiate discontinuities in the highly stressed regions. In addition, bending or folding is also believed to potentially cause surface oxidation of the chalcogen, the net result being increasing resistance and decreasing capacity for successive charging operations. As resistance builds at the bends or folds, "hot spots" may tend to form during the charge/recharge cycles due to this resistance. This heat may cause cathode polymer degradation.

This application describes various methods and systems that were investigated to overcome problems with relatively thin electrochemical cell systems, especially those problems associated with bending or folding of these systems.

In one embodiment, fifty lithium polymer electrolyte $V_6O_{13}$ cathode cells, each with about 30 cm$^2$ active area, were purchased from Dowty Engineering (Abingdon, Oxfordshire, U.K.). Several of these cells were used in charge/discharge tests. Six cells were also assembled into blocks to give a 2 V unit. Several 2 V blocks were connected to form 4 V and 6 V simulated batteries.

A simulated battery unit was built to include three 2 V cells to give a 6 V output. With cascaded voltage discharge plateaus, it was decided to use three cells to reduce the chance that the voltage would drop below 5.8 V. Certain commercially useful functions (e.g., certain telephone system functions) cease below 5.8 V.

Mylar or polyimide film was used as a separator material. The simple simulated battery in one embodiment did not include overcharge or overdischarge suppressors.

A. Preliminary Testing.

As a direct comparison with existing systems, a preliminary aspect of the development effort involved fitting a lithium film system into an existing Ni/Cd battery system. To this end, a jig was made to hold a Motorola Microtac battery case while it was precision opened with a one-sixteenth inch endmill cutter. In this manner clean resealable cuts were made. The battery was disassembled and a 5 cell Ni/Cd battery unit removed. A 3 cell simulated or "mockup" battery (i.e., 3 cells of 2 V each rigged to give a total of 6 V) using polyethylene film, heavy aluminum foil, and polyimide tape was made and fitted into the cavity of a Motorola Microtac battery. For weight comparison the weight of the equivalent volume of lithium cell material was calculated, and an equivalent weight and volume unit was built. The Ni/Cd unit weighed 107 grams but the polymer simulated battery weighed 38 grams. FIGS. 1A and 1B shows the cavity into which the simulated battery was filled.

A second simulated battery was also made using aluminum foil and paper added to a modified interconnect design. This was packaged in the same way and, including some allowance for interconnect weight, the complete case plus simulated battery weighed 49 grams.

To test the concern about the cathode cohesion films were bent about sharp radii. Test cells in their packets were folded around three different mandrels, and then discharged and charged. Charging and discharging the cells did not produce significant deterioration in cell capacity or performance for the first 7 discharge cycles. As such, it is believed that there is no obvious tearing or breaking of the electrolyte or electrode film materials. Nevertheless, after standing for about 10 days with the cell bent around the mandrel, the cell showed a pronounced delay in accepting charge when recharge was recommenced. Thus, while it is believed that for a relatively small number of change/discharge cycles no obvious tearing or breaking of the electrolyte or electrode film materials occurred, nevertheless the cells already exhibited performance degradation due to this folding. This performance degradation confirmed the necessity to design and build a substantially planar, non-folded, non-bent multilayer film stacked battery if the target of 1000 charge/recharge cycles operation was to be met.

B. Cell Design—General.

One embodiment of the invention is directed to a method of electrically interconnecting a plurality of relatively thin separate electrochemical cells. The cells are preferably less than about 50 mils (i.e., 50/1000 of an inch) thick, which is preferred since an important criteria for cell design is the amount of charge per weight/volume of cell. Since these relatively thin cells provide a relatively high amount of charge per weight/volume, it is preferable if such cells can be used.

Figure 4:
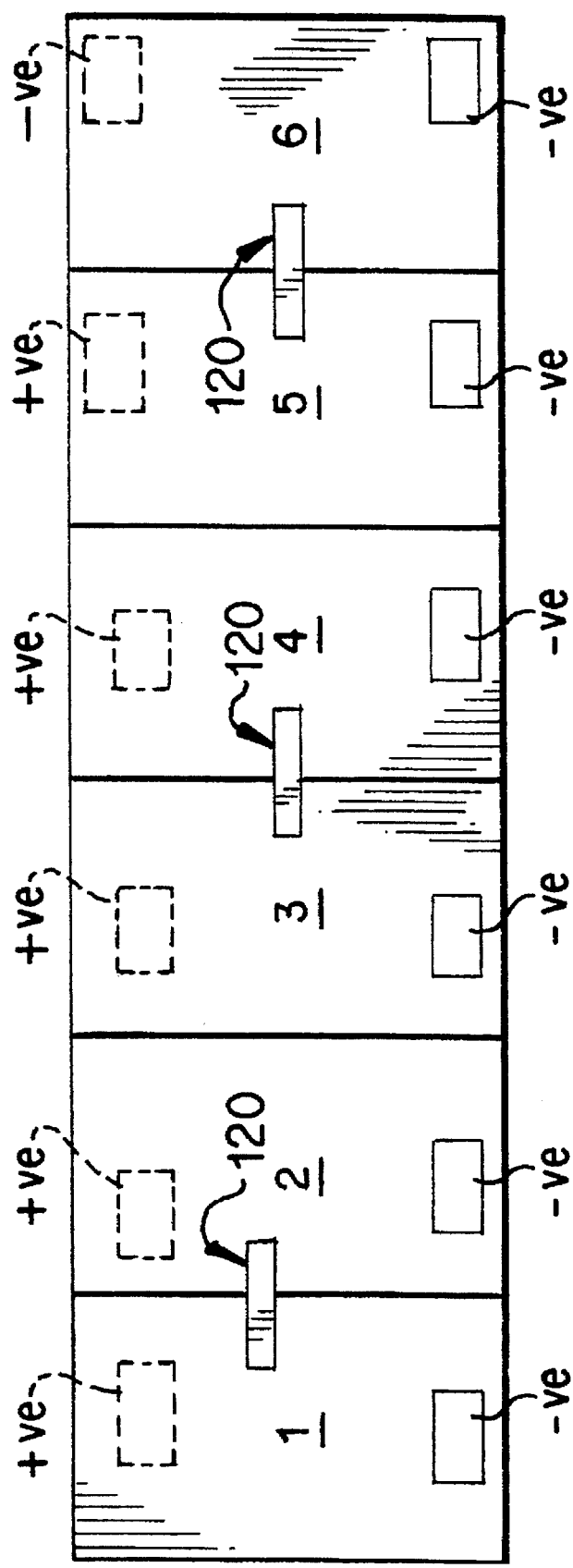
FIGS. 4, 5A, and 5B depicts a cell system made using a "book fold" interconnect system.
Figure 5A:
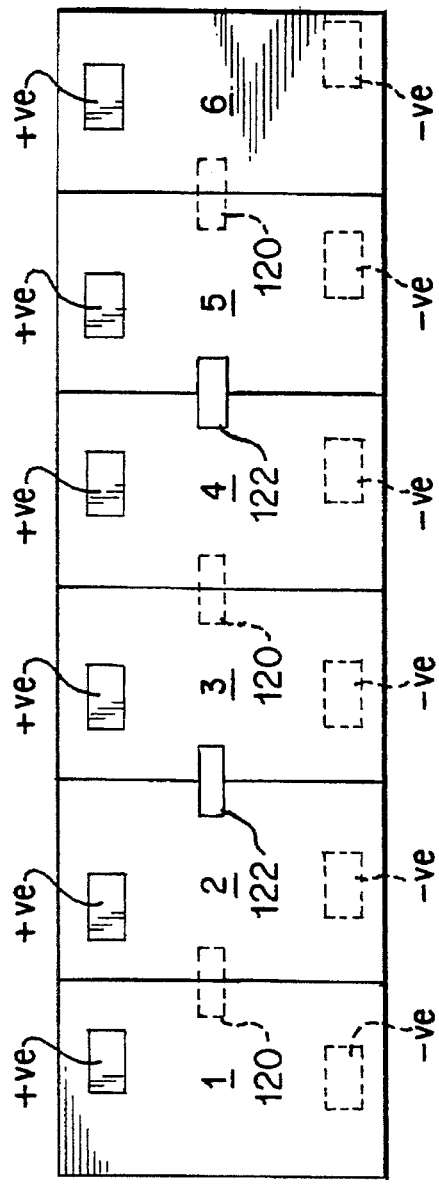
Figure 5B:
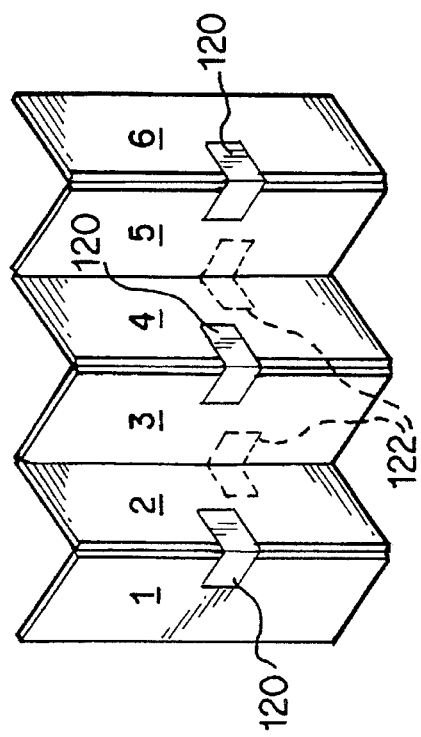

The electrochemical cells preferably include an electrolyte, a positive charge side, and a negative charge side located opposite the positive charge side. The positive and negative charge sides are shown in FIGS. 4, 5A and 5B, wherein the positive charge side is labeled with +ve and the negative charge side is labeled −ve. As shown in these figures (via shading), the positive charge sides are on opposite sides from the negative charge sides of the electrochemical sheets 1–6.

In one embodiment of the invention, two cells which are preferably less than about 50 mils thick are layered on one another such that the positive side of the first cell is coupled to the positive side of the second cell. Since these positive sides are coupled together, they form a first positive zone.

At this point a third cell which is preferably less than about 50 mils thick is layered on the first and second cells. The layering is done such that the negative side of the third cell is coupled to the negative side of the second cell to form a first negative zone. Of course, in an alternate embodiment negative charge sides in the first and second cells may be coupled together to form a first negative zone, and the third cell may be layered such that its positive side is coupled to the positive side of the second cell, thereby forming a first positive zone.

The method of this embodiment also involves electrically interconnecting the negative side of the first cell to the first negative zone, and electrically interconnecting the first positive zone to the positive side of the third cell.

Cells are coupled in the manner described above in order to have increased current capacity without (assuming cell voltage are equal) increasing cell voltage.

An advantage of the above-described method is that it allows for the construction of a system of relatively thin separate electrochemical cells wherein (i) a first cell is layered on a second cell, the layering being such that the positive side of the first cell is coupled to the positive side of the second cell to form a first positive zone, (ii) a third cell is layered on the first and second cells, the layering being such that the negative side of the third cell is coupled to the negative side of the second cell to form a first negative zone, (iii) an electrical interconnection interconnects the negative side of the first cell to the first negative zone, and (iv) an electrical interconnection interconnects the first positive zone to the positive side of the third cell. Since cells are directly coupled to one another, the need for electrically insulating separators between cells is minimized, and thus the weight and volume of any resulting set of cells or battery may be minimized. In addition, the above-described method allows separate substantially planer cells to be coupled without substantial folding or bending of the cells. As a result, the above-mentioned problems with folding and bending of the cells (e.g., increased electrical resistance, cell degradation, etc.) is significantly reduced or eliminated.

It is to be understood that in practice more than just three cells may be coupled together to form a set of cells or a battery. For instance, a fourth cell may be layered such that a positive side of the fourth cell is coupled to the positive side of the third cell to form a second positive charge zone, and such that the positive side of the first cell is interconnected to the second positive charge zone. In like manner, as many as 10, 100, 1000 or more cells may be connected together either in parallel (to increase current capacity) or in series (to increase voltage).

Cells connected in series increase cell voltage because oppositely charged sides of cells are coupled together. The method of the invention allows for the interconnection of a first set of cells to a second set of cells by layering a charged side of a cell in the first set to an oppositely charged side of a cell in the second set. Alternately, interconnecting may be performed by placing an electrically insulating separator between a charged side of a cell in a first set and a like-charged side of a cell in the third set, and then connecting a charged side of a cell in the first set to an oppositely charged side of a cell in the second set. Preferably the first method of in-series connection described above is used since it does not require the use of a electrically insulating separator, thus resulting in a reduction in battery weight and volume.

C. Cell Design—"Bunny Ear" Lobe Design.

In one embodiment a plurality of cells may be interconnected to adjacent cells by layering each cell upon one another as shown in FIG. 2. In FIG. 2 cell 102 is layered on cell 104, with an electrically insulating separator 106 therebetween. The separator 106 is preferably made of an insulating polymer material. FIG. 2 is only illustrative; in practice a greater number of cells may be interconnected as shown for the two cells in FIG. 2.

In one embodiment both cells 102 and 104 have their positive charge side +ve on their top sides, and their negative charge side −ve on their bottom sides. In another embodiment the cell 102 has a charged side on its upper side and the cell 104 has an oppositely charged side on its bottom side (in this embodiment a separator 106 may not need to be placed between the cells 102 and 104).

No matter which charged side is on top or bottom, both the positive and negative sides of the cells 102 and 104 preferably have a "bunny ear" or lobe 108 connecting them. Each lobe 108 may be a separate conductive strip attached to a cell or a protruding conductive surface of the cell itself. Preferably the bottom-most and top-most lobes 108 would be connected (e.g., laser welded, conductive adhesive bonded, or otherwise) to a connector that is made of, for example, copper foil. Most of the other lobes 108 would be bent or folded over a relatively thin insulating strip 110 (e.g., approximately 0.5"×0.010" and preferably made of a polymer) to insulate the connector from the constituents of the cell. One end of these lobes are preferably connected to positive and/or negative charge sides (e.g., current collectors) of the cells. Preferably all of the lobes 108 connected to positive charge +ve sides would be connected together with connector 112, and all of the lobes 108 connected to negative charge −ve sides would be connected together with a connector 114. Connecting each upper lobe 108 to the lobe 108 beneath tends to create a full electrical connection between the lobes 108 and the cells.

It is understood that insulating strip 110 may also be provided by coating an insulative liquid, such as an epoxy or polyimide, which hardens. The liquid coating may be applied by spraying, dipping, etc. (See FIG. 7B). Advantages of using a liquid coating include thinness, conformance, and ease of high volume manufacturing.

D. Cell Design—Cold Welded Cell Systems.

Figure 3B:
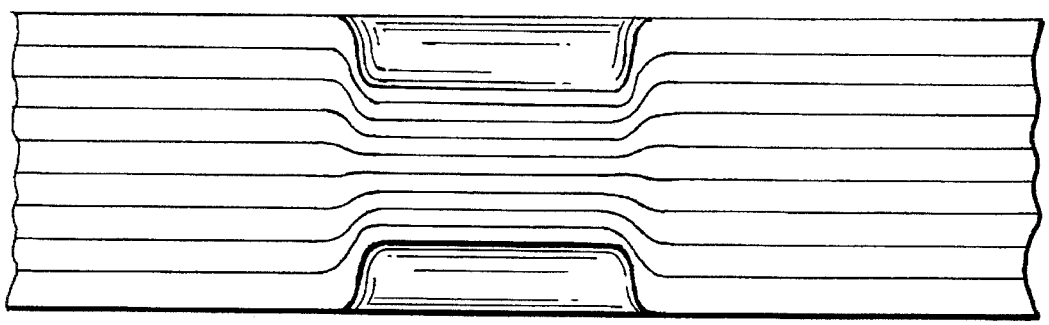

As shown in FIGS. 3A and 3B, in an alternate embodiment, cells may be coupled using cold welding processes. In one of these processes, slits may be made in each side of the cells to isolate the interconnect zones of the films. (See FIG. 3A). One side of the interconnect zone on corresponding sides of each cell then would have its cell contents stripped leaving a collector plate (e.g., a nickel plate) or the metallic compound (e.g., lithium) attached to the anode side of the cell so that a collector plate faced another collector plate on one side of the battery, and lithium faced other lithium on the other side of the battery. Each cell is then inter-leaved with a polymer separator shaped such that the whole area of the cell is electrically insulated except that the punched gap corresponding to the individual isolated collector areas (e.g., those areas with nickel), or lithium can be crimped into contact on each side of the multicell stack. Solder or adhesive inserts are interspersed between all the nickel cathode collector areas. The cell stacks are then crimped together at the isolated areas so that the exposed lithium of the anodes of each cell are cold welded to create a continuous anode interconnect. (See FIG. 3A). On the other side of the cell, the cathode collector sheets are cold welded via crimping the solder inserts or conductive adhesive bonding. The multiple stacks are then interconnected via an interconnect harness made of, for instance, copper foil to create the high voltage battery requirements. FIG. 3A depicts a cell that has not been slit but has been crimped.

E. Cell Design—Book Fold Design.

In this embodiment a multiplicity of separate sheets of cell material were used. The edges of a "concertina" or "fan" fold ●system were then replaced with bonded interconnecting conductive strips (e.g., copper foil). To prepare this system, the cells in each 2 V block were laid side by side with the same electrodes (i.e., charged sides) uppermost as in FIG. 4. Adhesive strips 120 made from, e.g., copper, were used to connect cells as shown in FIG. 4.

The cell array was turned over to show the other charged side of each cell as shown in FIG. 5A. Adhesive copper or other conducting tape 122 was then used to connect these charged sides as shown in FIG. 5A. When fan folded at the tape interconnect, a book-fold arrangement results as illustrated in FIG. 5B, with all the cells connected in parallel to give a 2 V block. Three such blocks in series constitute a 6 V multicell battery.

F. Cell Design—Direct Build Design.

Figure 6A:
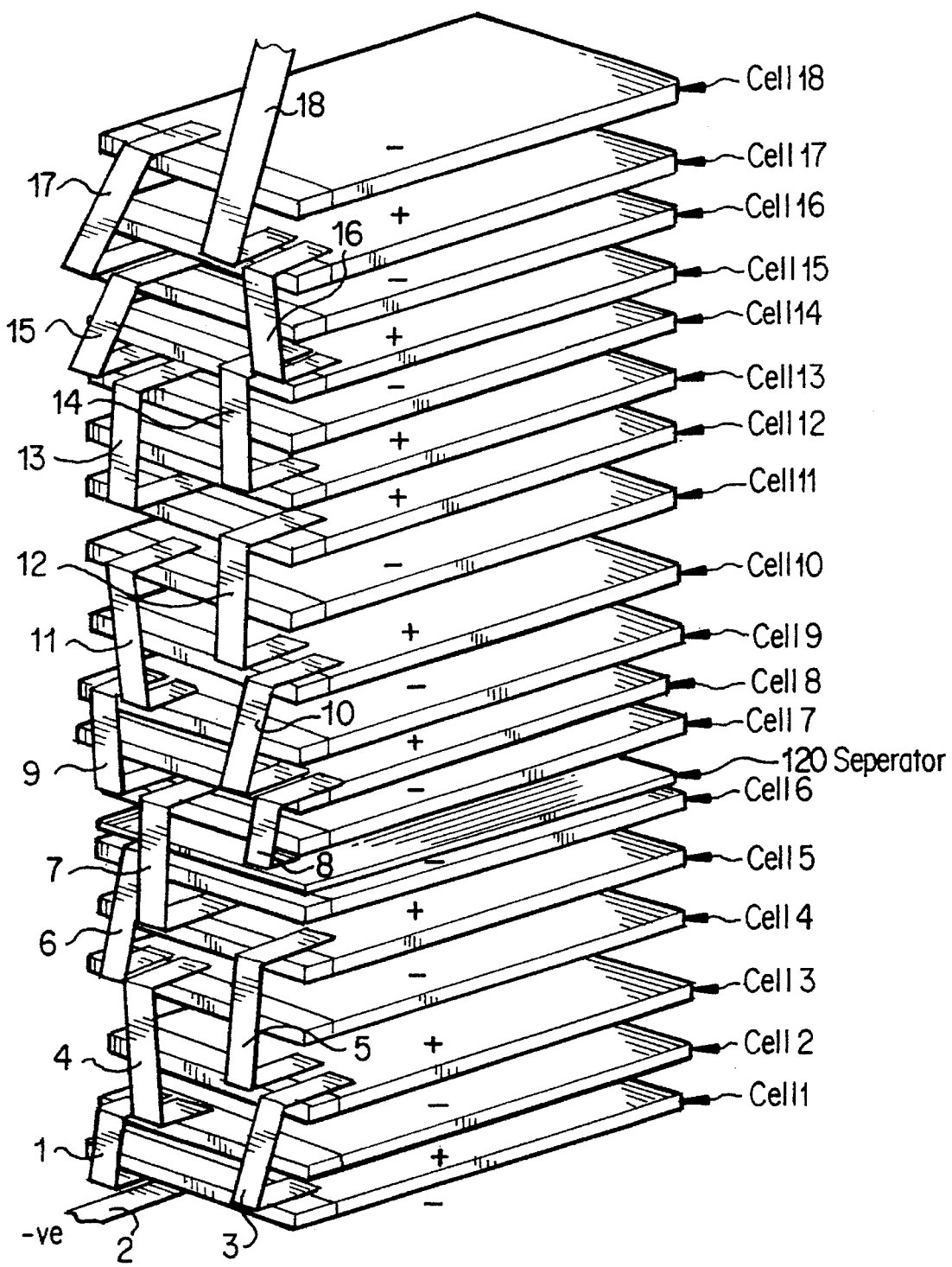
FIGS. 6A and 6B depict a cell system made using a "direct build" interconnect system.

FIG. 6A shows the assembly sequence used to build an eighteen cell, 6 volt multicell battery. Cells one to six represent a parallel six cell, 2 volt block. Adhesive backed conductor strip interconnections 1–18 (e.g., copper strips) were numbered sequentially according to the order in which they were attached. Bi-directional conductivity of the interconnections 1–18 was enhanced by applying a small deposit of EPO-TEK 415G conductive adhesive to the non-adhesive coated side of the conductor strip interconnections. As a result, the cells were held firmly in place, thus inhibiting the stack of cells from sliding and becoming disturbed or misaligned.

Strip Interconnections 1 and 2 were fixed to the −ve electrode side of cell 1, while interconnection 3 was fixed to the +ve electrode of cell 1. Cell 2 was assembled so that the +ve electrode side of the cell was layered on the +ve electrode side of cell 1 (thereby forming a first positive charge zone) and interconnection 4 was attached to the −ve side of cell 2. Interconnection 1 was looped such that it was attached to the −ve electrode side of cell 2, therefore creating the −ve interconnect between cells 1 and 2. Of course, it is to be understood that the charges could also be reversed to prepare the system (e.g., the interconnect between cells 1 and 2 could be a positive one and the first charge zone could be negative).

Cell 3 was placed on cell 2 with the −ve electrode sides in contact, thereby coupled these sides together to form the first negative charge zone. Interconnection 3 was attached to the +ve electrode side of cell 3 and interconnection 5 was fixed next to it.

Cell 4 was placed on cell 3 with the +ve electrodes in contact, thereby forming a second positive charge zone. The other end of interconnection 4 was fixed to the −ve electrode side of cell 4 and interconnection 6 was fixed next to it.

Cell 5 was placed on cell 4 with the −ve electrodes (negative charge sides) in contact. The end of interconnection 5 was fixed to the +ve electrode of cell 5 as was interconnection 7. An end of interconnection 6 was connected to the −ve electrode of cell 6. Cell 6 was layered on cell 5 such that their positive charge sides were coupled together, thereby forming another positive charge zone.

Interconnection 7 formed the series interconnect to the second six cell block which is isolated from the first six cell block by the insulator separator 120. The +ve electrode of cell 7 is placed down onto the separator and makes contact with interconnection 8 with interconnection 7 contacting the −ve electrode.

The second block of 6 cells was built up by contacting like electrodes of cells 7, 8, 9, 10, 11, and 12 and interconnection strips 8, 9, 10, 11, and 12.

Figure 6B:
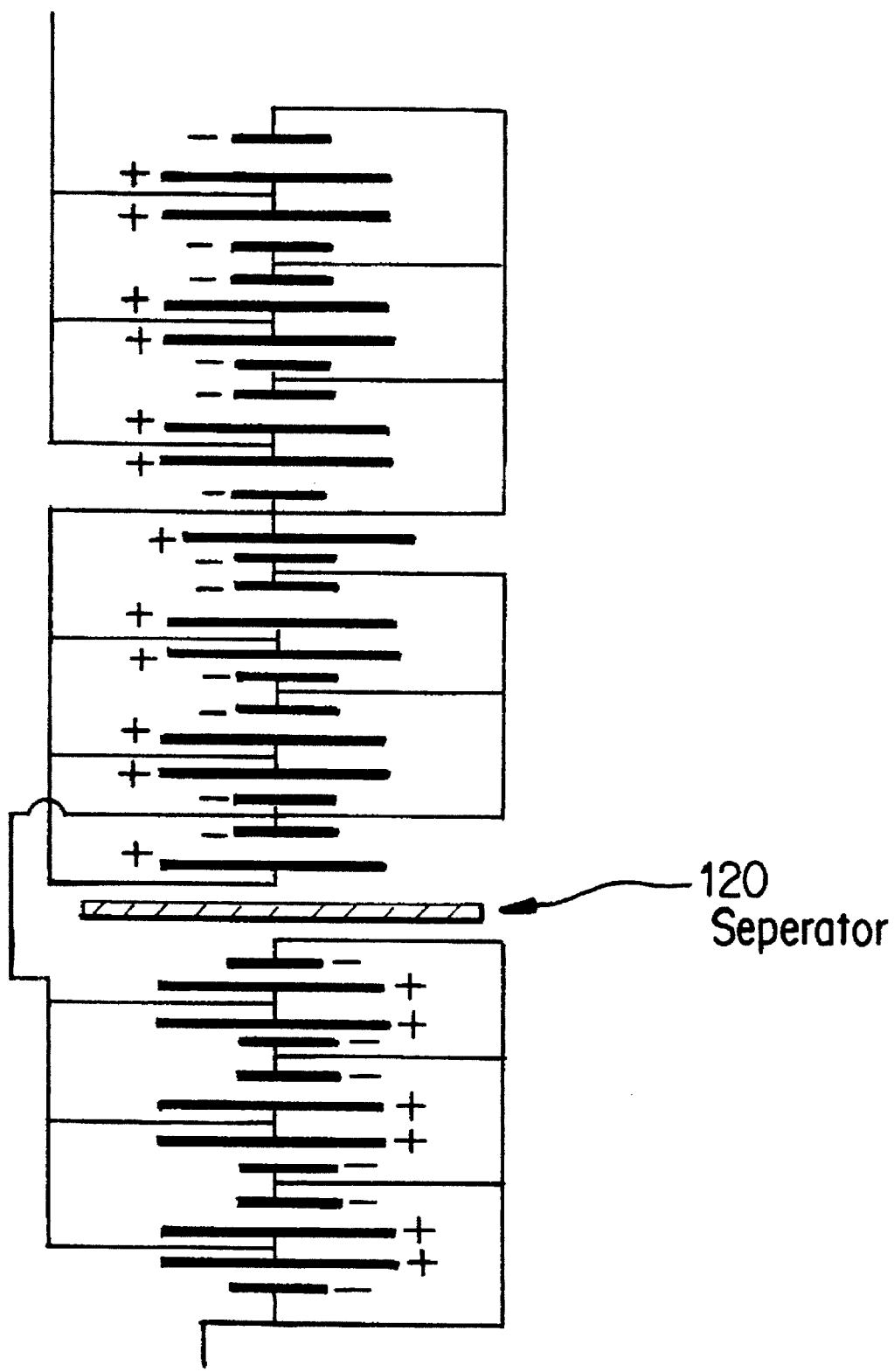

The multicell block connection between the second block and third block was achieved by direct contact of the +ve electrode of cell 12 with the −ve electrode of cell 13. The third block of six cells was built up laying like cell electrodes together from the +ve electrodes of cell 13 through cell 18 and interconnecting through interconnection strips 13, 14, 15, 16 and 17. Interconnection 18 provides the external connection of the multicell battery. An illustration of the full multicell assembly is shown in FIG. 6A with a schematic shown in FIG. 6B.

Both compression cold weld and adhesive form interconnections have been found to perform adequately. Preliminary resistivity tests were conducted with the cells intact in their hermetic bags. The exposed terminals were bonded, and comparisons were made between compression cold weld, adhesive form interconnection, and a welded interconnect. The compression cold weld and adhesive form interconnections were found to give equally low resistance connections comparable with the full metallurgical bond.

An advantage of the unistructure multicell structure shown in FIG. 6A is that it minimizes the number of intercell separator layers. This design required only one insulator separator 120 which reduced the total separator thickness contribution from 0.017" (if separators used between each cell) to 0.001".

Hermetically sealed cells were assembled in the lab and underwent preliminary charge discharge cycling, both as a single six cell 2 V unit, and as assembled into 4 V and 6 V assemblies.

The material used to demonstrate this invention covered a range capacity from 0.5 μAh/cm$^2$ up to 2 mah/cm$^2$, with the actual capacity supplied being dependent upon the current status and consistency of materials development. Material that had the upper level of capacity would have produced a 3 Wh battery for the battery volume illustrated in FIGS. 1A and 1B. The actual battery built was a 0.75 Wh unit reflecting the fact that the material used had a capacity at the lower end of the range. The NiCd battery used for comparison was a 1.5 Wh unit.

G. Cell Fabrication Protocol.

Cell sets and systems, and batteries, may be made using the following protocol.

Figure 7A:
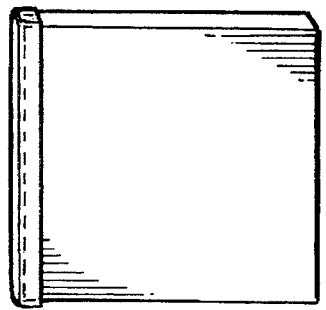
FIGS. 7A, 7B, 7C, and 7D depict battery cells in various stages of assembly using a "direct build" interconnect system.
Figure 7B:
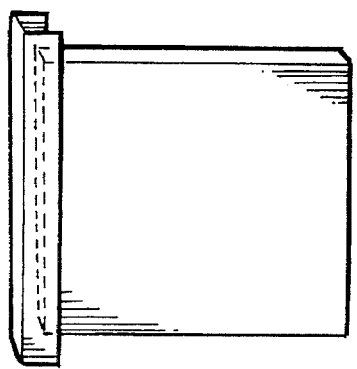

Cells may be received in sealed hermetic bags. Immediately after removal from its bag, each cell may be masked only along one short edge with adhesive Kevlar strip as shown in FIG. 7A (top diagram). Because of the appearance of a wrinkling of the cell edges, in some examples, when the individual cells were disassembled, an insulating tape or coating may also be applied to all four cell edges before the multicell re-assembly is attempted.

The cells preferably have their top 0.25" masked with insulation tape (e.g., Kapton insulating tape, 3M Company, St. Paul, Minn. U.S.A.) on both sides. Tape may be applied across the top 0.25" of each cell. It may then be folded across to other side to completely insulate the top 0.25" of the cell.

Preferably one relatively long and one standard length copper interconnect piece (e.g. tape) can be attached to the right hand side of −ve collector of cell 1 so that the copper tape overlaps the insulating tape and directly contacts the collector.

Figure 7C:
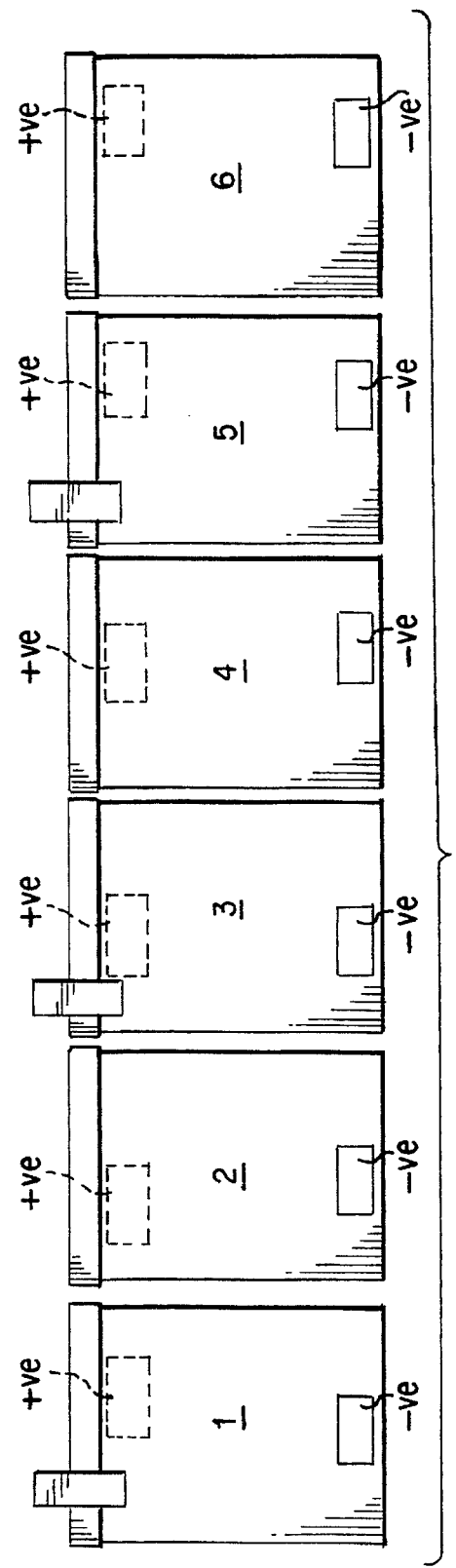
Figure 7D:
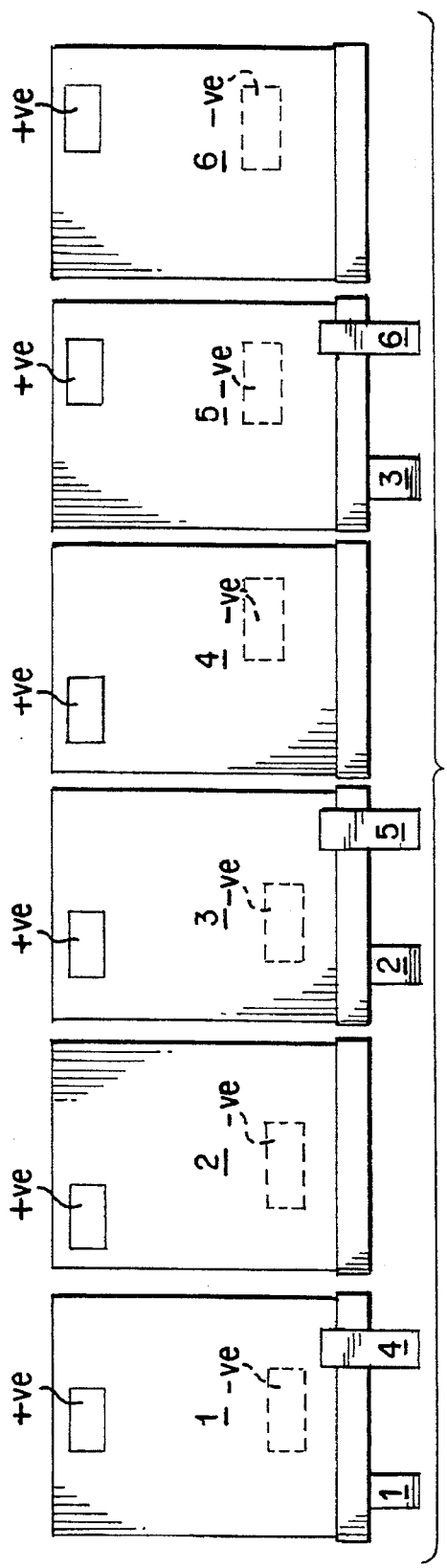
Figure 9:
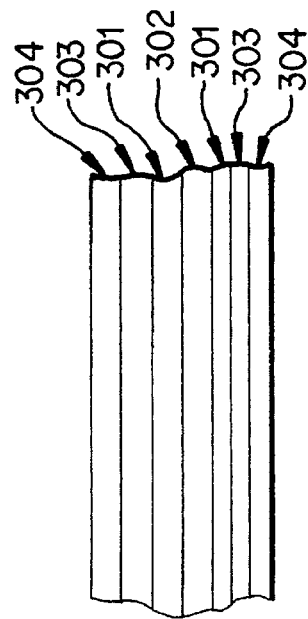
FIGS. 8–9 depict cell embodiments.
Figure 8:
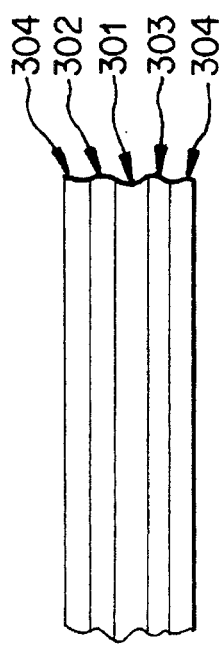

The cell may then be turned over and a standard copper tab may be attached to the right hand side of +ve collector of cell 1. The bottom part of the tab be coated with a conductive adhesive. The assembly shown in FIGS. 7C and 7D may be used to attach tabs to the cells.

Cells 1 & 2 may be aligned or stacked, masked end to masked end, with cell 2 on top of cell 1, and the like charged (either +ve or −ve) collectors from both cells placed in contact. Conductive adhesive can be used to attach these like-charged collectors. The tab from the opposite charged collector at the bottom of stack (i.e., the bottom of cell 1) can be attached to the top surface opposite charged collector of Cell 2.

For the purposes of this protocol, it is assumed that the like-charged sides of cells 1 and 2 were positive, and the oppositely charged sides of cells 1 and 2 were negative.

Further tabs can also be attached. For instance, tab 4 may be placed on the top collector (i.e., the top of cell 2) adjacent to attached tab. Preferably tab 4 is placed on the left hand side of the already attached tab. Both tab ends can then be coated with conductive adhesive. Cell 3 may then be aligned and stacked on top of cell 2, with the −ve collectors in contact. Connector 3 may then be attached to the top side (the +ve collector) of cell 3.

Connector tab 5 may then be attached on top of cell 3 (preferably on the right hand side). Tabs 3 and 5 can then be coated with adhesive. Cell 4 may then be aligned an stacked on top of cell 3 with +ve collector down. Connector tab 4 may then be attached to the top side (the −ve collector) of cell 4. Collector tab 6 may then be attached on cell 4 (preferably on the left hand side) and the tab ends coated with adhesive.

Similar procedures may be conducted for cells 5 and 6 (and their corresponding tabs) as were conducted for cells 3 and 4 (and their corresponding tabs), thereby forming the multilayer cell structure shown in FIG. 6A. In these procedures the like-polarity collectors contact each other, and tabs are used to connect noncontacting collectors.

As shown in FIG. 6A, a separator 120 (e.g., an insulated sheet) may be placed on cell 6. A connector tab 8 may be attached on the left hand side of Cell 7 on the +ve collector. At this point cell 7 may be placed on the stack of cells with its +ve collector face down.

Tab 7 (which has previously been connected to the −ve collector of cell 6) may then be connected to the left hand side on top (i.e., on the −ve collector) of cell 7. Tab 9 may then be connected to the top (i.e. on the −ve collector) of cell 7 and coated with adhesive. Further cells may then be stacked, placing like collectors face to face and connecting like polarity plates together until cells 1–12 are assembled as shown in FIG. 6A.

As shown in FIG. 6A, tabs 12 and 13 may then be coated with adhesive. Cell 13 may then be stacked with its −ve collector face down on top of the +ve collector face of cell 12. At this point, tab 14 may be attached on the right hand side top of cell 13 (+ve collector), and the sequence of cells can be continued as previously described until the stack of cells 1–18 in FIG. 6A is constructed.

A battery made according to the above protocol (and as shown in FIG. 6A) was constructed and connected to a Motorola portable phone system. The battery powered up the phone system to give a dial tone and lit the display. Then, owing to the absence of the voltage control circuitry, the display overload triggered a shut-down due to a voltage overload. The battery built in this way, with the polymer materials' cascade discharge characteristic, initially had a discharge voltage of approx. 7.4 V when connected to a phone system. This battery powered up the system to give a dial tone.

H. Cell Design—Motorola Housing Calculations.

Based on the tests performed, it is anticipated that the Motorola battery housing can be fitted with thin film lithium polymer battery cells with the following specifications.

The Motorola cell had area dimensions of 3.2955" (83.71 mm) by 1.8790" (47.3 mm). The thickness of the Motorola Ni/Cd cell was 0.2430" (6.48 mm).

A single polymer cell weighs 1.666 grams. The thickness of the cell is 0.010" (0.255 mm). The thickness of separator is 0.0025", and the thickness of the multicell layer=0.0125". The number of layers (in cell thickness) which is possible is therefore 19.44. Rounding down, the maximum number of layers that would fit into the Motorola housing would be 19.

A 3 unit multicell (at 2 V each) would have 6 volts during operation (see FIG. 6(1) embodiment). Each battery unit should be 6 cells thick and weigh 10 grams, and thus the total multicell battery will weigh 30 grams and have 18 cells. It would be a 120 mAh and 0.72 Wh unit.

The electrode area of the proposed unit would be 39.6 $cm^2$. Discharge would measure=4 mA, and the discharge density would be 0.1 $mA/cm^2$.

Obviously, using Nickel foil adds weight. For instance, with a 0.001" (0.00254 cm) thick Ni collector, the volume of Ni is 0.1005 cc, the weight of Ni is 0.9 grams. At 0.9 grams, if 0.5 mil of Ni used with 2 current collectors per cell, the Ni would be approximately 54% of the cell weight. In practice, the actual Ni foil thickness was 0.0007 inch per current collector, which was a total of 0.0014 inch per cell. This thickness of Ni equals about 1.26 g, or about 75% of the cell weight.

Because of weight considerations, it is anticipated that at least some portion of the Ni layer could be replaced with Ni coated polymer. In a preferred embodiment, the polymer would have a 4000 Angstrom coating of Ni. Since the weight of 0.001" of polymer film is 0.09 grams, the weight of both sides of a cell with 0.001" of polymer coating would be 0.1800 g. As such, the weight of a cell with polymer films would be 0.946 g, the weight of 6 such cells would be 5.7 g, and the weight of an 18 cell multicell battery would be 17 g. This 17 g weight of an 18 cell battery compares favorably to the 38 g weight found when using solid Ni foil.

In addition, with no Ni, the weight of the active cell constituents is 0.766 g, and the cell energy density moves from 24 WH/Kg (incl. Ni collectors) to about 42–52 WH/Kg.

Using the above technology, it is possible to build a multicell battery with only about 40% of the weight, but about 2.6 times the capacity, of the existing commercially available Ni/Cd batteries.

In this application, the term "soldering" includes soldering, microsoldering, reflow soldering, and vapor phase soldering. The term "welding" includes spot welding, tack welding, seam welding, and microwelding. The term "coupling" means bonding items together, and/or placing or layering such items next to each other so that they form an electrical connection.

An advantage of invention is that it is in some circumstances easier to make battery systems by coupling separate cells together a layer at a time, thus forming a multicell system. Since such cells are not bent or folded, the rechargeability of the resulting battery systems is enhanced.

Further modifications an alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements and compositions described herein or in the features or in the sequence of features of the methods described herein without departing from the spirit and scope of the invention as described in the following claims.

What is claimed is:

1. A method of electrically interconnecting a plurality of relatively thin separate electrochemical cells comprising:

layering a first cell and a second cell wherein both the first and second cells are each less than about 50 mils thick and comprise an electrolyte, a first charge side, and a second charge side located opposite the first charge side, the layering being such that the first charge side of the first cell is coupled to the first charge side of the second cell to form a first charge zone;

layering a third cell that is less than about 50 mils thick and comprises an electrolyte, a first charge side, and a second charge side located opposite the first charge side, the layering being such that the second charge side of the third cell is coupled to the second charge side of the second cell to form a second charge zone;

electrically interconnecting the second charge side of the first cell to the second charge zone;

electrically interconnecting the first charge zone to the first charge side of the third cell.

2. The method of claim 1 wherein the cells are substantially planer and are layered without substantial bending or folding of the cells.

3. The method of claim 1, wherein at least two cells that are interconnected comprise a set of cells, and further comprising electrically interconnecting a first set of cells to a second set of cells.

4. The method of claim 3 wherein the first set of cells is interconnected to the second set of cells by layering a charged side of a cell in the first set on an oppositely charged side of a cell in the second set.

5. The method of claim 4, further comprising interconnecting a third set of cells to the first or second set of cells by layering a cell from the third set of cells on the first or second sets, the layering being such that a charged side of a cell in the first or second sets is placed against a first side of an electrically insulating separator, and a second side of the electrically insulating separator is placed against a like-charged side of a cell in the third set, and wherein a charged side of a cell in the first or second sets is interconnected to on an oppositely charged side of a cell in the third set.

6. The method of claim 3, wherein the interconnecting is by (i) layering a charged side of a cell in one set to an oppositely charged side of a cell in another set, (ii) placing an electrically insulating separator between a charged side of a cell in one set and a like-charged side of a cell in another set, and (iii) interconnecting a charged side of a cell in one set to an oppositely charged side of a cell in another set, the interconnecting being such that a minimum number of separators are used.

7. The method of claim 1, further comprising layering a fourth cell such that a first charge side of the fourth cell is coupled to the first charge side of the third cell to form another first charge zone, and further interconnecting the first charge side of the first cell to this first charge zone.

8. The method of claim 7, further comprising interconnecting the second charge zone to the second charge side of the fourth cell.

9. The method of claim 1 wherein a plurality of cells comprise an electrically conducting lobe extending laterally from an edge of each cell and connected to first or second charge sides of the cells, and wherein the interconnecting is performed by electrically connecting lobes together.

10. The method of claim 9 wherein lobes connected to first charge sides extend from a first edge of each cell such that these first lobes are substantially vertically aligned with one another, and lobes connected to second charge sides extend from a second edge of each cell such that these second lobes are substantially vertically aligned with one another.

11. The method of claim 10 wherein the first and second edges of the cells are opposite of each other.

12. The method of claim 10, further comprising placing an electrically insulating separator between a portion of at least one lobe and the cell to which it is connected, the separator being placed such that the lobe is electrically connected to a first or second charge side of the cell but is otherwise electrically insulated from the cell.

13. The method of claim 1, wherein the layering and interconnecting is performed by:
   aligning the cells side by side such that the first and second charge sides of the cells are each facing the same direction;
   connecting a foldable electrically interconnecting material to sides of the cells, the connecting being such that the second charge side of the first cell is electrically interconnected by the material to the second charge side of the second cell;
   connecting a foldable electrically interconnecting material to sides of the cells, the connecting being such that the first side of the second cell is electrically interconnected by the material to the first side of the third cell; and
   layering the cells such that the foldable material is folded to form a connecting hinge between cells, the layering being such that the first charge side of the first cell is coupled to the first charge side of the second cell to form the first charge zone, and the second charge side of the third cell is coupled to the second charge side of the second cell to form the second charge zone.

14. The method of claim 13, further comprising placing an electrically insulating separator between a portion of the foldable material and the cell to which it is connected, the separator being placed such that the foldable material is electrically connected to a first or second charge side of the cell but is otherwise electrically insulated from the cell.

15. The method of claim 1, wherein interconnecting is performed using conductive adhesive bonding.

16. The method of claim 1, wherein interconnecting is performed using compressive cold welding.

17. The method of claim 1, wherein interconnecting is performed using laser bonding.

18. The method of claim 1, wherein interconnecting is performed using soldering or welding.

19. The method of claim 1, wherein interconnecting is performed using interconnecting pieces that comprise a first adhesive side, the interconnecting pieces being coupled to the electrochemical cells.

20. The method of claim 19 wherein the interconnecting pieces comprise metal foil with electrically conducting adhesive applied to one side of the foil to form a adhesive side.

21. The method of claim 19, wherein the interconnecting pieces comprise a second substantially nonadhesive side, and further comprising applying conductive adhesive to the second substantially nonadhesive side of the interconnecting pieces.

22. The method of claim 19 wherein interconnecting pieces are coupled to cells prior to the cells being layered.

23. The method of claim 1, wherein each cell has edges, and further comprising applying an insulator to an edge of each cell.

24. The method of claim 23 wherein the interconnecting pieces are coupled to the electrochemical cells such that the interconnecting pieces are coupled to a first or second charge side of the cells, the pieces extending across the insulator applied to the edges of each cell.

25. The method of claim 23 wherein the insulator comprises tape that is insulating.

26. The method of claim 19 wherein the interconnecting pieces comprise ends that are coupled to the first or second charge sides of the cells, and wherein the interconnecting pieces are electrically insulated except at the ends.

27. The method of claim 1, further comprising applying liquid conductive adhesive bonding material to the sides of the cells prior to layering.

28. The method of claim 1 wherein the cells are lithium polymer cells.

29. The method of claim 28 wherein the cells include a cathode comprising vanadium oxide.

30. The method of claim 28 wherein a cell comprises a substantially planer electrolyte with a first side coupled to a first side of a substantially planer anode, and a second side coupled to a first side of a substantially planer cathode, the anode and cathode both having second sides that are opposite the first sides, these second sides being coupled to current collectors.

31. The method of claim 28 wherein a cell comprises a substantially planer anode with a first side opposite a second side, both sides of the anode being coupled to first sides of substantially planer electrolytes, the electrolytes both having second sides which are coupled to first sides of substantially planer cathodes, the cathodes both having second sides that are coupled to current collectors.

32. The method of claim 1, further comprising recharging the cells.

33. The method of claim 1, further comprising bending or folding the cells.

34. The method of claim 1, further comprising hermetically sealing the cells.

35. A system of relatively thin separate electrochemical cells comprising:
   a first cell layered on a second cell, the first and second cells each being less than about 50 mils thick and each comprising an electrolyte, a first charge side, and a second charge side located opposite the first charge side, the layering being such that the first charge side of the first cell is coupled to the first charge side of the second cell to form a first charge zone;
   a third cell layered on the first and second cells, the third cell being less than about 50 mils thick and comprising an electrolyte, a first charge side, and a second charge side located opposite the first charge side, the layering being such that the second charge side of the third cell is coupled to the second charge side of the second cell to form a second charge zone;
   an electrical interconnection interconnecting the second charge side of the first cell to the second charge zone;
   an electrical interconnection interconnecting the first charge zone to the first charge side of the third cell.

36. The system of claim 35 wherein the cells are substantially planer and are not substantially bent or folded.

37. The system of claim 35 wherein at least two cells which are electrically interconnected comprise a set, and wherein a first set of cells is electrically interconnected to a second set of cells.

38. The system of claim 37 wherein the first set of cells is interconnected to the second set of cells such that a charged side of a cell in the first set is coupled to an oppositely charged side of a cell in the second set.

39. The system of claim 38, further comprising a third set of cells interconnected to the first and second sets, and further comprising an electrically insulating separator between a charged side of a cell in the first or second sets and a like-charged side of a cell in the third set.

40. The system of claim 39 wherein the interconnections are such that the system comprises a minimum number of separators.

41. The system of claim 35, further comprising a fourth cell layered such that a first charge side of the fourth cell is coupled to the first charge side of the third cell to form another first charge zone, and such that the first charge side of the first cell is interconnected to this second charge zone.

42. The system of claim 41, further comprising an electrical interconnection interconnecting the second charge zone between the second and third cells to the second charge side of the fourth cell.

43. The system of claim 35 wherein a plurality of cells comprise a electrically conducting lobe extending from an edge of each cell and connected to first or second charge sides of the cells, and wherein lobes connected to first charge sides of cells are electrically connected together.

44. The system of claim 43 wherein lobes connected to first charge sides extend from a first edge of each cell such that these first lobes are substantially vertically aligned with one another, and lobes connected to second charge sides extend from a second edge of each cell such that these second lobes are substantially vertically aligned with one another.

45. The system of claim 44 wherein the first and second edges of the cells are opposite each other.

46. The system of claim 44, further comprising an electrically insulating separator between a portion of at least one lobe and the cell to which it is connected, the separator being placed such that the lobe is electrically connected to a first or second charge side of the cell but is otherwise electrically insulated from the cell.

47. The system of claim 35, further comprising a foldable electrically interconnecting material connected to sides of the cells, the connecting being such that the second charge side of the first cell is electrically interconnected by the material to the second charge side of the second cell, and such that the first charge side of the second cell is electrically interconnected by the material to the first charge side of the third cell.

48. The system of claim 47 wherein the cells are layered such that the foldable material is folded to form a connecting hinge between cells, the layering being such that the first charge side of the first cell is coupled to the first charge side of the second cell to form the first charge zone, and the second charge side of the third cell is coupled to the second charge side of the second cell to form the second charge zone.

49. The system of claim 48, further comprising an electrically insulating separator between a portion of the foldable material and the cell to which it is connected, the separator being placed such that the foldable material is electrically connected to a first or second charge of the cell but is otherwise electrically insulated from the cell.

50. The system of claim 35, further comprising conductive adhesive electrically interconnecting the cells together.

51. The system of claim 35, wherein the interconnections are compressive cold welded to the cells.

52. The system of claim 35, wherein the interconnections are laser bonded to the cells.

53. The system of claim 35, wherein interconnections are soldered or welded to the cells.

54. The system of claim 35, further comprising interconnecting pieces that comprise a first adhesive side, the interconnecting pieces being coupled to the electrochemical cells.

55. The system of claim 54 wherein the interconnecting pieces comprise metal foil with electrically conducting adhesive applied to one side of it to form an adhesive side.

56. The system of claim 54, wherein the interconnecting pieces comprise a second substantially nonadhesive side, and further comprise conductive adhesive applied to the second substantially nonadhesive side of the interconnecting pieces.

57. The system of claim 35, wherein each cell has edges, and further comprising an insulator coupled to an edge of a cell.

58. The system of claim 54 wherein the interconnecting pieces are coupled to the electrochemical cells such that the interconnecting pieces extend across the insulator applied to the edges of each cell.

59. The system of claim 54 wherein the insulator comprises tape that is insulating.

60. The system of claim 54 wherein the interconnecting pieces comprise ends that are coupled to the cells, and wherein the interconnecting pieces are electrically insulated except at the ends.

61. The system of claim 35, further comprising liquid conductive adhesive bonded to the sides of the cells.

62. The system of claim 35 wherein the cells are lithium polymer cells.

63. The system of claim 62 wherein the cells include a cathode comprising vanadium oxide.

64. The system of claim 62 wherein a cell comprises a substantially planer electrolyte with a first side coupled to a first side of a substantially planer anode, and a second side coupled to a first side of a substantially planer cathode, the anode and cathode both having second sides that are opposite the first sides, these second sides being coupled to current collectors.

65. The system of claim 62 wherein a cell comprises a substantially planer anode with a first side opposite a second side, both sides of the anode being coupled to first sides of substantially planer electrolytes, the electrolytes both having second sides which are coupled to first sides of substantially planer cathodes, the cathodes both having second sides that are coupled to current collectors.

66. The system of claim 35 wherein the cells are rechargeable.

67. The system of claim 35 wherein the cells are bendable.

68. The system of claim 35 wherein the cells are hermetically sealed.

69. A system of cells made according to the method of claim 1.

* * * * *